Sept. 25, 1962   J. W. ROMINE   3,055,153
TREE WRAPPING MACHINE
Filed Aug. 17, 1959   8 Sheets-Sheet 1

INVENTOR.
James W. Romine
BY
ATTORNEYS.

Sept. 25, 1962     J. W. ROMINE     3,055,153
TREE WRAPPING MACHINE Filed Aug. 17, 1959     8 Sheets-Sheet 8

FIG. 17.

INVENTOR.
James W. Romine.
BY
Karnes, Dickey & Pierce
ATTORNEYS.

United States Patent Office 3,055,153
Patented Sept. 25, 1962

3,055,153
TREE WRAPPING MACHINE
James W. Romine, Monroe, Mich., assignor to The Greening Nursery Company, Monroe, Mich., a corporation of Michigan
Filed Aug. 17, 1959, Ser. No. 834,298
23 Claims. (Cl. 53—124)

This invention relates to machines for bagging trees, and more particularly to an improved machine for bagging the roots of a tree together with material to preserve the roots for shipment and storage.

A machine for bagging trees is disclosed in my earlier Patent No. 2,847,808. This machine packed preservative material around the roots of a tree and automatically inserted the roots together with the preservative material into a bag or wrapper positioned on an extension of the machine.

It is one object of the invention to provide an improved machine of the type described for automatically bagging the roots of trees and plants.

It is another object of the invention to provide a machine of the type described for automatically bagging the roots of trees having an improved driving mechanism for pushing the roots into the bag.

It is a further object of the invention to provide a machine of the type described for automatically bagging the roots of trees having an improved mechanism for packing the preservative material around the roots of the trees and plants.

It is a still further object of the invention to provide a machine of the type described which is economical, easy to operate, and rapid and dependable in operation.

Other objects, features and advantages of the present invention will become apparent from the following detailed description taken in conjunction with the accompanying drawings, in which:

FIG. 8 is an enlarged fragmentary view looking in the direction of the arrow A of FIG. 1;

FIG. 18 is an enlarged fragmentary view looking in the direction of the arrow "A" of FIG. 11;

FIG. 19 is a broken perspective view of the right end of the machine illustrated in FIG. 11, and FIG. 20 is a fragmentary view of the drive sprocket supporting the right end of the endless chain of the machine illustrated in FIG. 11.

Referring to the drawings, a tree wrapping machine embodying features of the present invention comprises a tripod frame 12 having a longitudinal bar 14, a transverse bar 16 and three legs 18, 20 and 22. A trough 24 is positioned at one end of the tripod to receive the roots of a tree with the branches thereof extending toward the other end of the tripod in the same manner as illustrated in the aforementioned patent with a preservative material compressed lightly about the roots to form a shaped mass.

A hollow mandrel 26 in the form of a split cylinder is also supported by the tripod frame in aligned extension of the trough 24, and a suitable paper bag, wrapping material or other container is slipped over the mandrel. A semicylindrical plate 28 is pivotally mounted upon leg 20 of the tripod frame by means of a link assembly 30 and is swingable from the position illustrated in FIG. 4 to the position illustrated in FIG. 1 to compress the preservative material about the roots within the trough 24 and to form it into a cylindrical mass. The cylindrical form of the resulting mass permits it to be pushed from the end of the trough 24 into and through the mandrel 26 into the container which advances off of the mandrel as the mass is advanced therethrough in a manner to be described.

A drive mechanism 32 is mounted on the tripod frame 12 and includes a longitudinally extending pusher bar 34 having one end thereof welded to a curved plate 38 having a yoke 36 pivotally mounted thereon by lugs 40. The yoke 36 is adapted to engage a mass of tree roots and preservative material compressed within the trough 24, and to push the mass through the trough and the mandrel 26 when the pusher bar 34 is advanced as will be described.

Figures 4, 5:
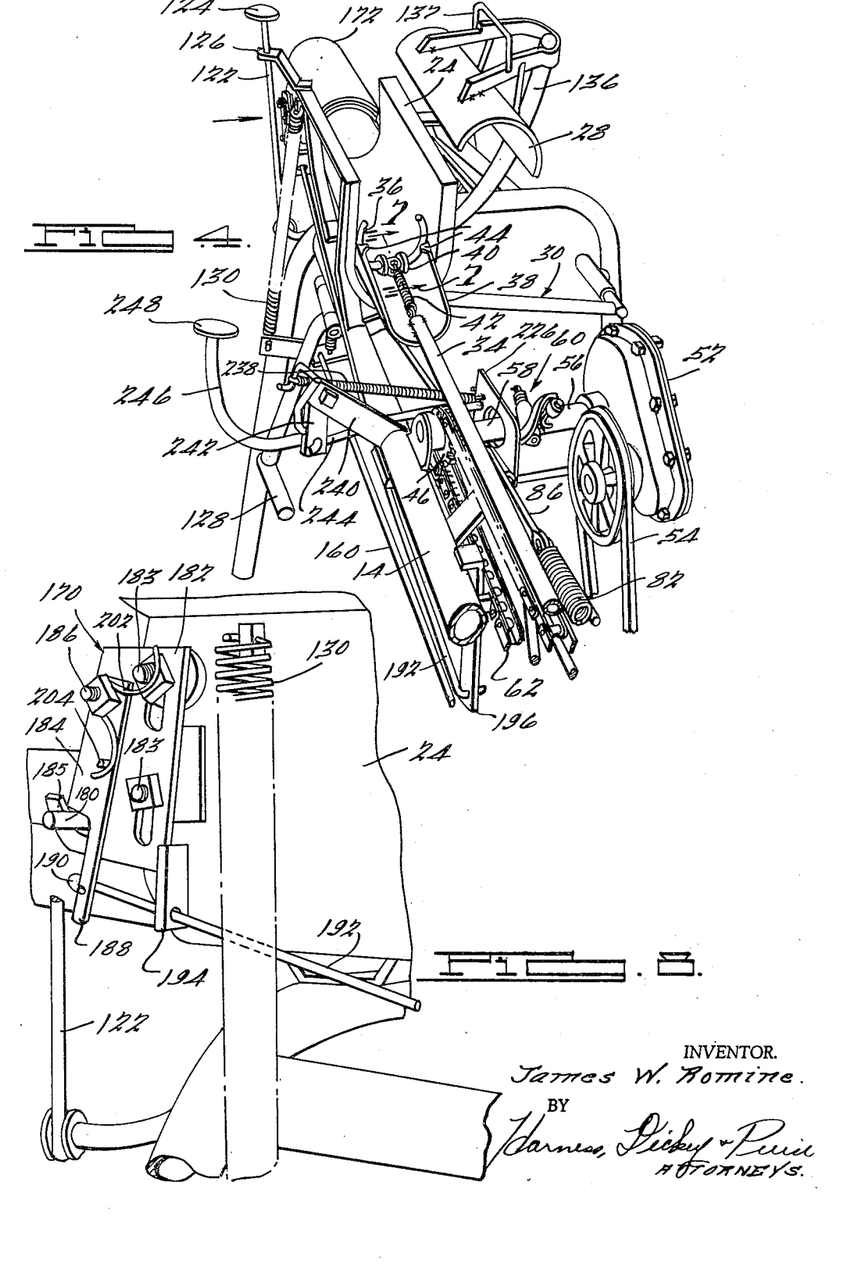
FIG. 4 is an enlarged perspective view of the left half of the machine illustrated in FIG. 1.
FIG. 5 is a sectional view of the machine illustrated in FIG. 1 taken along the line 5—5 thereof.
Figure 5:
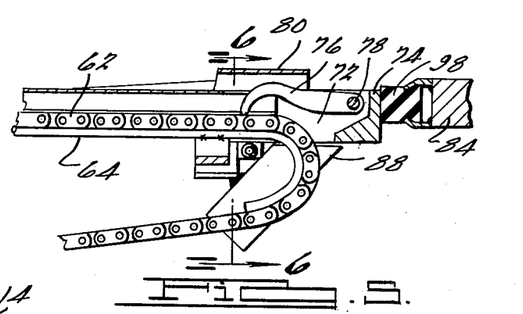

The curved plate 38 is slidably supported on the bottom of the trough 24 and a spring 42 is connected between the yoke 36, as most clearly illustrated in FIG. 4, and the end of the pusher bar 34 so as to normally bias the yoke 36 to the vertical position illustrated wherein the yoke abuts against stops 44 projecting inwardly from the edges of the curved plate 38. With this construction, the yoke is free to pivot in the opposite direction against the action of the spring 42 should it strike against the far end of the mandrel 26 on the return stroke of the pusher bar.

When the pusher bar 34 is advanced so that the yoke 36 pushes the roots through the mandrel 26, the yoke will advance beyond the end of the mandrel to push the containers supported on the mandrel partially off the mandrel but the curved plate 38 or at least a part thereof will remain in the mandrel to maintain the yoke in alignment therewith. However, should the yoke strike the end of the mandrel 26 as it re-enters the mandrel when the pusher bar 34 is retracted, it will pivot against the action of the spring 42 to prevent damage to the end of the mandrel.

As most clearly illustrated in FIGS. 1 and 4–6, the drive mechanism 32 is comprised of a sprocket 46 which is journaled on the longitudinal bar 14 of the tripod frame by a bushing 48 and is rotatably driven by a motor 50 which is connected to a speed reducer 52 by a belt 54. The speed reducer has an output shaft 56 extending therefrom which is telescopically disposed in a shaft 58 connected to the sprocket 46, the shafts 56 and 58 being drivingly connected together by a clutch 60.

The sprocket 46 drives a chain 62 having the other end thereof slidably supported by a bent rod 64 which is welded or otherwise fixed to the tripod frame 12. The pusher bar 34 has the one end thereof slidably supported on the trough 24 by the curved plate 38, as previously described, and the other end thereof is slidably supported on the longitudinal bar 14 of the tripod frame by a bracket 66 which is welded to an end fitting 68 fixed to and extending from the end of the pusher bar 34.

The end fitting 68 is comprised of parallel spaced-apart plates 70 and 72 interconnected by an end plate 74 with a hook 76 pivotally mounted between the plates 70 and 72 by a pin 78. The hook 76 is spring biased to the position illustrated and is adapted to be urged downwardly by a plate 80 in a manner to be described so as to engage the chain 62 to drive the pusher bar 34 forwardly to push the roots of the tree through the mandrel 26 as previously described. The hook is formed so that once it engages a link of the chain 62 it will remain engaged until cammed from the chain by the sprocket 46. A long spring 82 is provided with one end fixed to a bumper 84 and the other end thereof fixed to the forward end of the pusher bar 34 by a rod 86 or the like, so that the pusher bar is at all times resiliently urged to the right, as viewed in FIG. 1, to help maintain the hook 76 in engagement with the chain and to return the pusher bar to its retracted position when the hook is cammed from the chain by the sprocket 46 as described. The bent rod 64 supports the chain 62 against sagging to enable the hook 76 to properly engage the chain, and suitable plates 88 or the like are supported on brackets carried by the longitudinal bar 14 of the tripod frame on either side of the chain 62 adjacent the bent portion of the rod 64 to guide the chain therebetween to prevent it from slipping off the bent rod 64.

The bumper 84 is pivotally supported on the leg 22 of the tripod frame by a rod 90 pivoted within a bushing 92 welded to the leg 22. A suitable spring 94 having one end connected to a fixed bracket 96 by a rod 95 and the other end connected to the rod 90 maintains the bumper 84 in the position illustrated in FIG. 1 and enables it to cushion the rapid return of the pusher bar 34 to the retracted position when the hook 76 is disengaged at the sprocket 46. A suitable resilient pad 98 is also secured to the bumper 84 against which the end plate 74 of the end fitting 68 is adapted to strike to further absorb the shock. When the pusher bar 34 is retracted by the spring 82 so that the end plate strikes the resilient pad 98, the spring 94 will permit the bumper 84 to pivot to the right, as viewed in FIG. 1, a limited amount to further cushion the jolt as previously described.

Figures 1, 2:
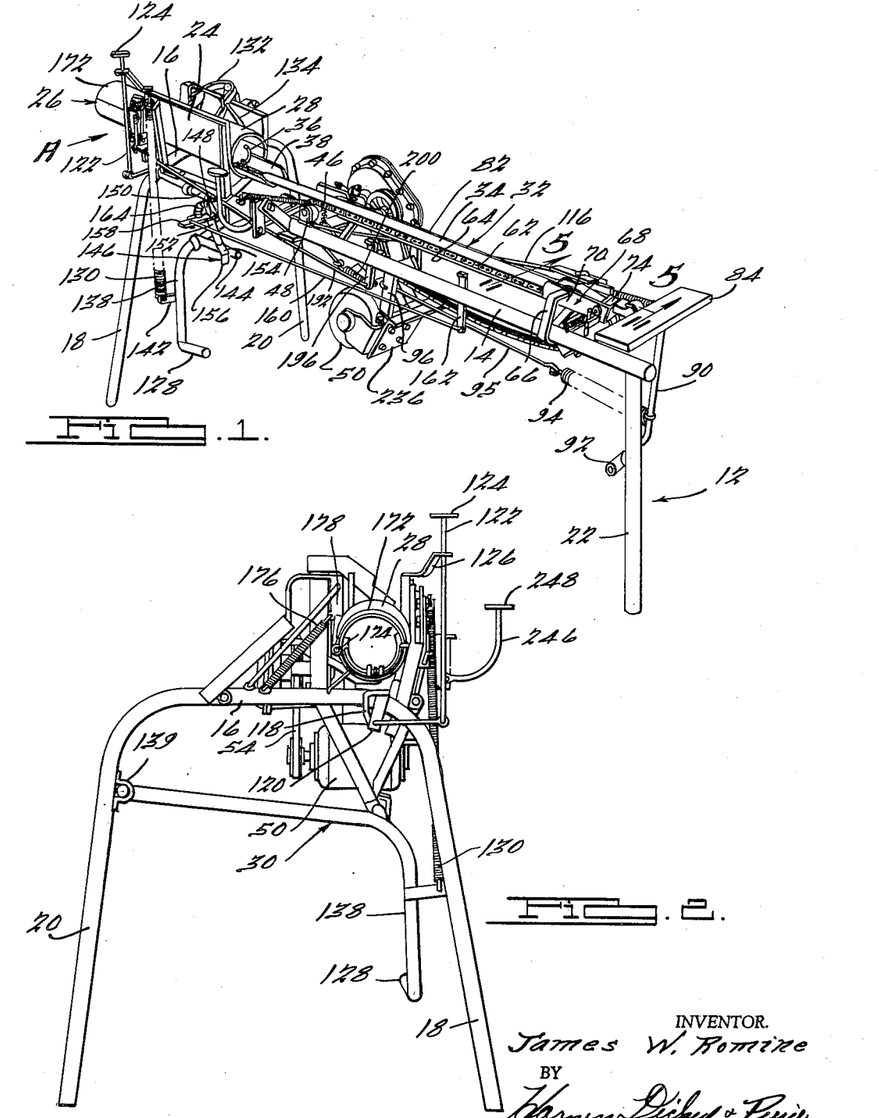
FIGURE 1 is a perspective view of a machine embodying features of the invention.
FIG. 2 is an enlarged end view of the machine illustrated in FIG. 1 as viewed from the left end thereof.
Figure 3:
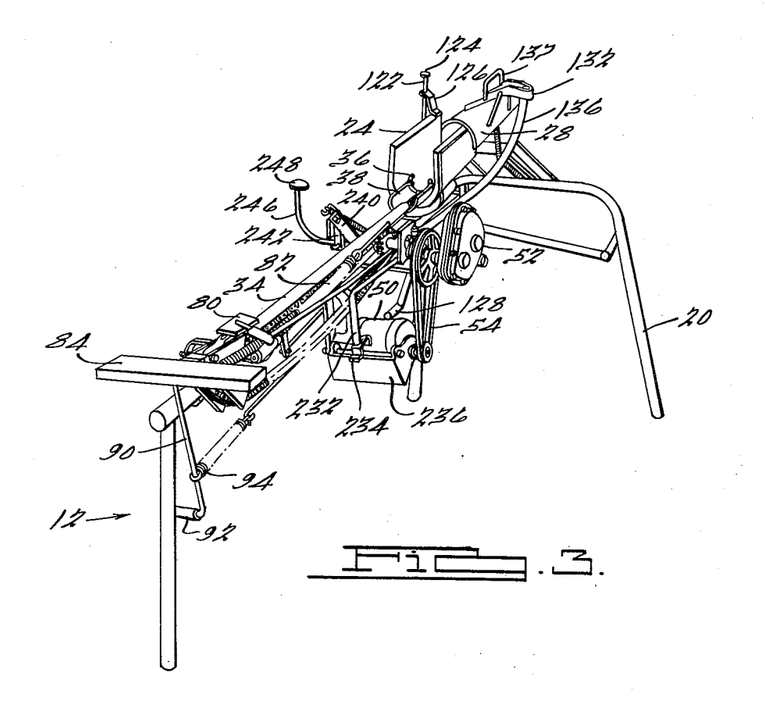
FIG. 3 is a perspective view of the other side of the machine illustrated in FIG. 1.
Figure 6:
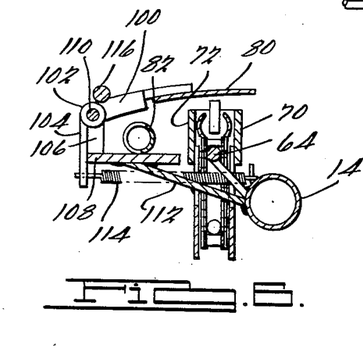
FIG. 6 is a sectional view of the structure illustrated in FIG. 5 taken along the line 6—6 thereof.
Figure 7:
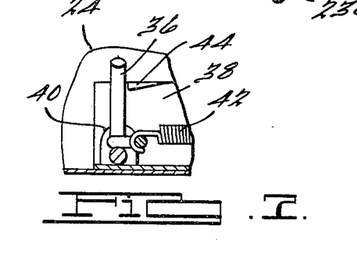
FIG. 7 is an enlarged sectional view of the structure illustrated in FIG. 4 taken along the line 7—7 thereof.

As most clearly illustrated in FIGS. 1, 3 and 6, the plate 80 for pivoting the hook 76 into engagement with the chain 62 is welded to an arm 100 fixed to a bushing 102 having another arm 104 depending therefrom. The bushing 102 is pivotally mounted on a member 106 projecting from a plate 108 by a pin 110 with the plate being fixed to the longitudinal bar 14 by a bracket 112. It will be observed that the plate 108 also provides a support for the end of the spring 82. A spring 114 is connected between the depending arm 104 and the longitudinal bar 14 to normally bias the arm 104 against the plate 108 so that the plate 80 is maintained in the position illustrated in FIG. 6 spaced above the hook 76.

The plate 80 is moved downwardly so as to urge the hook 76 into engagement with the chain by a rod 116 fixed to the top of the arm 100. The rod 116 extends the length of the machine and has a bent portion 118 on the end thereof which is pivotally supported by a bracket 120 welded or otherwise affixed to the transverse bar 16 of the tripod frame as most clearly illustrated in FIG. 2. The end of the bent portion 118 is pivotally connected to a rod 122 having a head 124 thereon. The rod 122 is slidably carried by a bracket 126 also fixed to the tripod frame so that when the rod 122 is depressed, the rod 116 will force the plate 80 downwardly, which, in turn, pivots the hook 76 into engagement with the chain 62 to advance the pusher bar 34.

As stated previously, the semicylindrical plate 28 is carried by a link assembly 30 to enable it to be moved from the position illustrated in FIG. 4 to the position illustrated in FIG. 1 when a footrest 128 is depressed against the action of a spring 130 to the position illustrated in FIG. 1. The link assembly 30 comprises a yoke 132 connected to the semicylindrical plate 28 and having suitable reinforcing members 134, a curved bar 136 having one end fixed to the yoke 132 and extending downwardly and beneath the trough 24 with the other end thereof pivoted on a bar 138 intermediate the ends thereof, the lower end of the bar having the footrest 128 formed thereon and the upper end thereof being bent and pivotally mounted on the leg 20 by the bracket 139. A suitable bracket 142 is fixed to the bar 138 for securing the lower end of the spring 130 with the upper end of the spring being connected to the trough 24. A longitudinally extending bar portion 144 is fixed to the bar 138, as most clearly illustrated in FIG. 1, in position to be engaged by a latching mechanism 146.

The latching mechanism 146 is comprised of a rod 148 having the upper end thereof pivotally mounted on the longitudinal bar 14 as at 150 and a tubular member 152 telescopically mounted on the lower end thereof. An angle-shaped latch plate is fixed to the lower end of the tubular member 152 and has a horizontal portion 154 adapted to ride on the bar portion 144 and a depending vertical portion 156. The upper end of the tubular member 152 carries a laterally outwardly projecting finger 158 having the end of a longitudinally extending rod 160 pivotally connected thereto. The other end of the rod 160 is pivotally connected to a camming member 162 pivotally mounted intermediate its ends on the longitudinal bar 14 with the upper end thereof in position to be cammed forwardly when engaged by the end fitting 68 when the pusher bar 34 has advanced a sufficient distance so that the end fitting can engage the camming member 162. Forward movement of the upper end of the camming member of course moves the lower end thereof to the rear of the machine which, in turn, pivots the finger 158 and tubular member 152 in a counterclockwise direction when viewed from above. Since the vertical portion 156 of the latch plate engages the bar portion 144, the counterclockwise movement causes the horizontal portion 154 to ride off the bar portion and release the link assembly 30 so that the spring 130 can pivot the semicylindrical plate 28 of the trough 24 into the position illustrated in FIG. 4.

With this construction, the latching mechanism 146 can hold the linkage assembly 30 in the position illustrated in FIG. 1 against a relatively strong force exerted by the spring 130. Yet the latching mechanism still can be disengaged by a relatively small force exerted by the rod 160 on the finger 158 because of the manner in which the horizontal portion 154 is cammed off of the bar portion 144. A suitable spring 164 is attached to the finger 158 and the other end thereof is connected to the tripod frame 12 in a manner to pivot the finger 158 normally in a clockwise direction, as viewed from above in FIG. 1, to pull upwardly thereon to prevent the tubular member 152 from sliding off of the rod 148 and to normally bias the tubular member 152 inwardly against the bar portion 144 so that the horizontal portion 154 of the latch will latch the bar portion 144 as soon as it is moved to the position illustrated in FIG. 1 by the pressure of an operator's foot on the footrest 128. Of course, since the spring 164 normally pivots the finger 158 in the aforesaid clockwise direction, it will bias the camming member 162 to the position illustrated in FIG. 1 in position to be engaged by the end fitting 68 as previously described.

As most clearly illustrated in FIGS. 2, 4 and 8, another latching mechanism 170 is fixed to the side of the trough 24 adjacent one end thereof for automatically releasing upper semicylindrical portion 172 of the mandrel 26, which is pivotally connected to the lower half of the mandrel as at 174 so that it can swing open in response to a force applied thereto by spring 176 connected between the transverse bar 16 of the tripod frame and a bracket 178 fixed to the upper semicylindrical portion 172.

A suitable pin 180 or the like is fixed to and projects from the upper semicylindrical portion 172 and is firmly clamped within a slot formed by plate 182 of the latching mechanism 170 and a locking member 184 pivotally mounted on the plate 182 by a bolt 186 or the like, the plate 182 being mounted on the trough 24 by bolts 183 or the like. A finger 188 of the member 184 extends downwardly past the pin 180 and is engaged by a hook 190 formed on the end of a longitudinally extending rod 192 slidably carried by a bracket 194 fixed to the side of the trough 24. The other end of the rod 192 is pivotally connected to a camming member 196 pivotally mounted on the transverse bar 14 in a manner similar to the camming member 162 and engageable by the end fitting 68 in the same manner when the end fitting reaches the end of its travel and the pusher bar 34 has advanced to its forwardmost position. A suitable spring 200 is connected to the lower end of the camming member 196 to normally bias it to the vertical position illustrated in FIG. 1, and a suitable spring 202 is mounted on the member 184 by bolt 186 and has one end thereof hooked over a pin 204 projecting from the member 184 to bias it in a clockwise direction, as viewed in FIG. 8, so that the pin 180 is retained within the slot formed by the bottom edge of the member 184 and a finger 185 projecting from the plate 182. When the end fitting 68 cams the camming member 196, it pulls on the rod 192 to pivot the member 184 in a counterclockwise direction to enable the pin 180 to move free of the latching mechanism 170 in response to the tension of the spring 176 as previously described.

Figure 9:
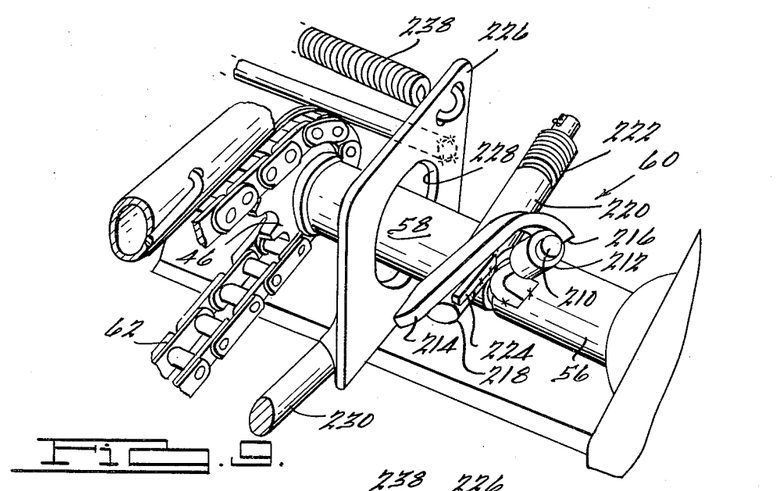
FIG. 9 is an enlarged fragmentary view of the clutch assembly of the machine illustrated in FIG. 1.
Figure 10:
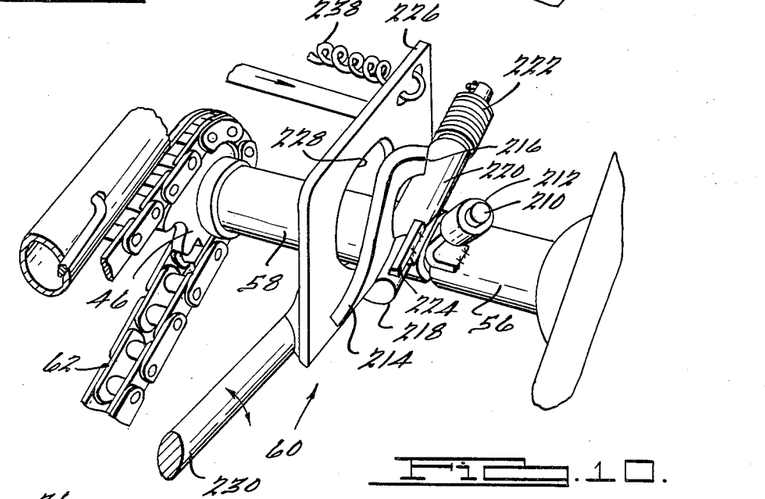
FIG. 10 is an enlarged perspective view of the clutch assembly of FIG. 9 in the disengaged position.

Referring to FIGS. 4, 9 and 10, the clutch 60 for drivingly connecting the speed reducer 52 to the sprocket 46 is comprised of a lug 210 projecting from the output shaft 56 and having a roller 212 journaled on the end thereof. A latch plate 214 having a curved end portion 216 is pivotally mounted on a bushing 220 fixed to the shaft 58 by a pin 218 on the lower end thereof which extends through and projects from the bushing 220. A suitable spring 222 is mounted on the pin 218 and connected to the bushing 220 to normally bias the latch plate 214 against a stop 224 fixed to and projecting from the bushing 220, as illustrated in FIG. 9, so that the curved portion 216 of the latch is in position to engage the roller 212. The spring 222 is strong enough to prevent the disengagement of the curved portion 216 from the roller 212 so that the output shaft 56 and the shaft 58 are drivingly connected together.

To disengage the clutch 50 a plate 226 having an enlarged aperture 228 therein is disposed over the shaft 58 and fixed to the end of a rod 230 having the other end thereof bent vertically and journaled in a bushing 232 fixed to a bracket 234 which, in turn, is fixed to a supporting member 236 suspended from the tripod frame for supporting the motor 50. With this construction, the plate 226 can be pivoted toward and away from the latch 214, and when in the position illustrated in FIG. 10, it will engage the lower end of the latch 214 and pivot the latch in a counterclockwise direction so that the curved end portion 216 is moved out of engagement with the roller 212, and when in a position as illustrated in FIG. 9, the latch plate 214 can be pivoted clockwise by the spring 222 back into engagement with the roller 212.

A suitable spring 238 is connected between the plate 226 and a bracket 240 fixed to the longitudinal bar 14 to normally urge the plate 226 to the position illustrated in FIG. 9. A strap 242 is pivotally mounted at its upper end to the bracket 240 and has a rod 244 pivotally connected to the lower end thereof with the other end of the rod being fixed to the plate 226. A curved bar 246 having a head 248 is fixed to the strap 242 so that when the operator pushes down on the handrest 248 the strap 242 will swing inwardly to cause the rod 244 to push the plate 226 to the position illustrated in FIG. 10 against the action of the spring 238 to disengage the clutch 60.

In operation, some root packing material is placed in the bottom of the trough 24 and a tree is laid in position with its roots upon the packing material in the bottom of the trough. Additional packing material is placed loosely around the roots of the tree in the trough and handle 137 is grasped to pivot the semicylindrical plate 28 and curved bar 136 forwardly on the bar 138 until the semicylindrical plate overlies the trough 24. The semicylindrical plate is then moved downwardly into the trough 24 to compact the roots and packing material by exerting a force on the footrest 128 until the horizontal portion 154 of the latch mechanism 146 engages the bar portion 144 to lock the semicylindrical plate 28 in the position illustrated in FIG. 1, in which position the packing material is suitably compressed about the roots of the tree to form a cylindrical mass. A bag (not shown) into which the roots and packing material are to be inserted is then slipped over the mandrel 26. The head 124 is then pushed down on by the operator to pivot the plate 80 downwardly to engage the hook 76 with the chain 62. Since the clutch 60 is normally urged to the position illustrated in FIG. 9, the chain 62 is continuously driven by the motor 50 unless the operator pushes down on the head 248 to disengage the latch 214 from the roller 212 as previously described.

Once the hook 76 is engaged in a link of the chain 62, the pusher bar 34 is advanced against the action of the spring 82 to drive the yoke 38 forwardly to push the roots and packing material out of the trough 24 into and through the mandrel 26 and into the bag. As the yoke passes through the trough 24, the semi-cylindrical plate 28 is automatically retracted by the tripping of the camming member 162 which is engaged by the end fitting 68 at this point. When the yoke 36 reaches the end of the mandrel 26 and the bag has been moved therefrom, the camming member 196 is actuated by the end fitting 168 to trip the locking member 184 which frees the pin 180 to enable the spring 186 to pivot the upper semicylindrical portion 172 of the mandrel counterclockwise, as viewed in FIG. 2, to a position that does not interfere with the lifting of the tree from the mandrel 26. Of course, when in this position, the machine is now ready to receive another tree or plant.

As the end fitting 68 continues to advance beyond the camming member 196, the hook 76 is cammed from the chain by the sprocket 46, as previously described, and the spring 82 rapidly drives the pusher bar rearwardly until the end plate 74 of the end fitting 68 strikes the resilient pad 98 on the spring mounted bumper 84, the bumper absorbing the shock of the end fitting striking thereagainst, by pivoting rearwardly a limited distance against the action of the spring 94.

Figures 10, 11, 12:
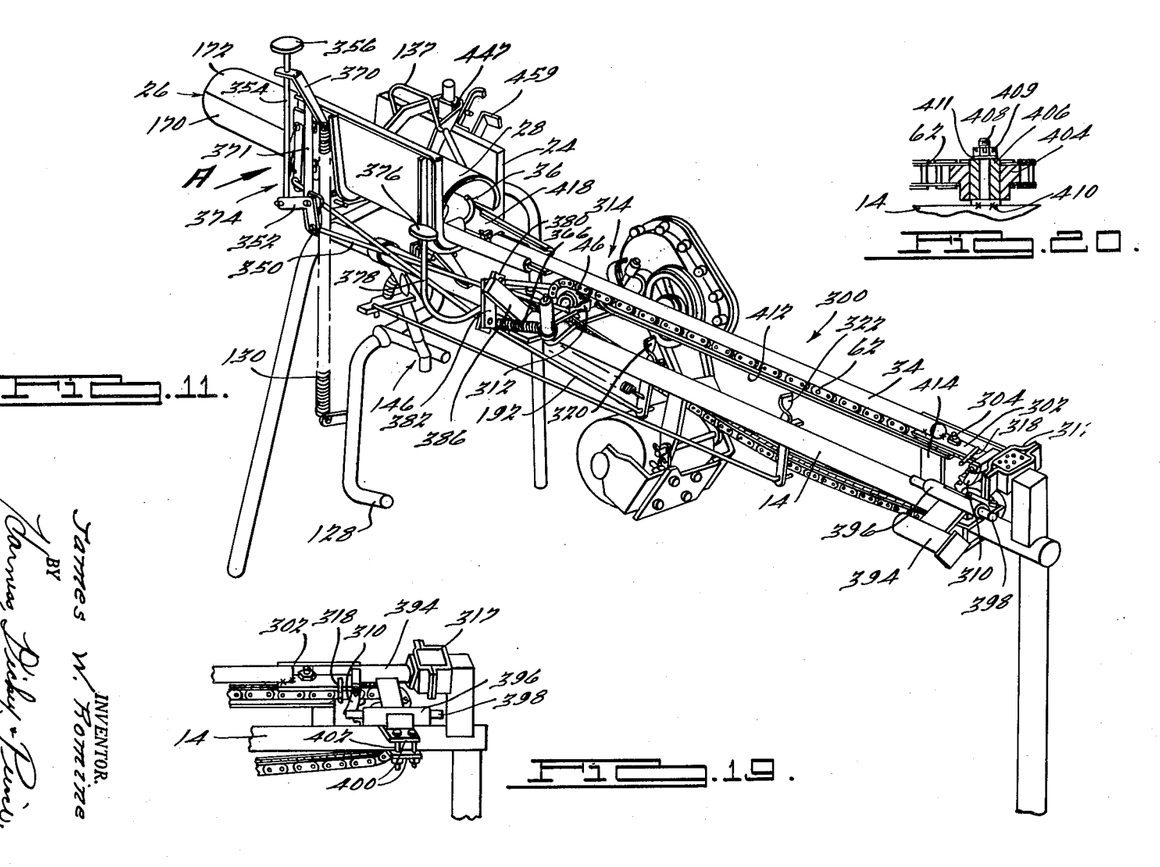
FIG. 11 is a perspective view similar to that of FIG. 1 illustrating another embodiment of the present invention.
FIG. 12 is an enlarged broken perspective view of the front portion of the machine illustrated in FIG. 11.
Figure 12:
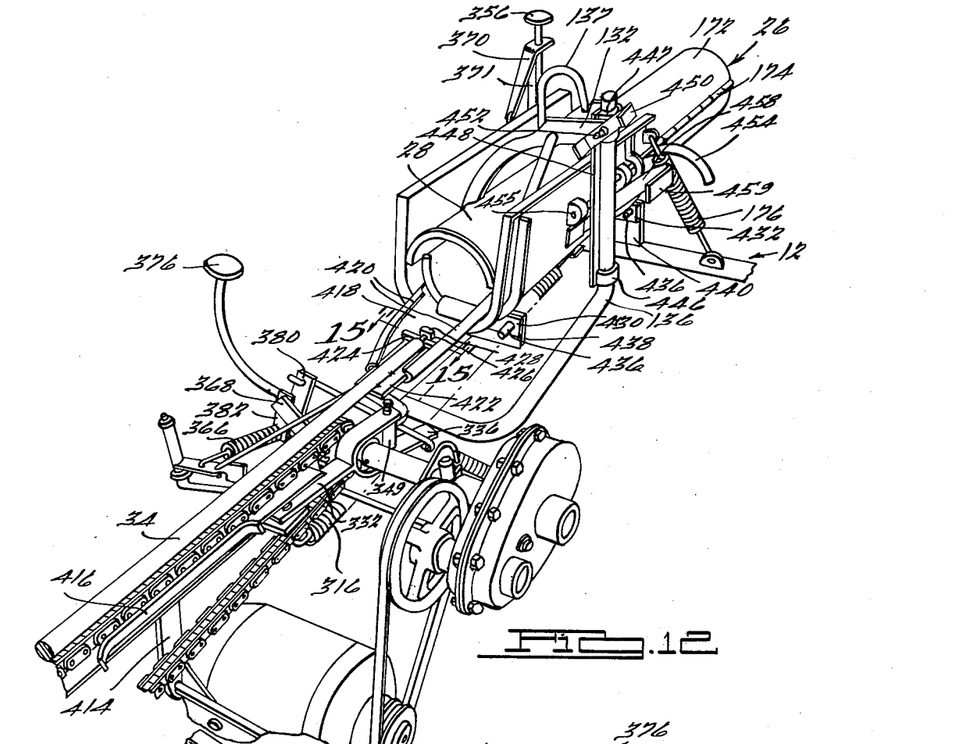

Another embodiment of the present invention is illustrated in FIG. 11 wherein the parts which are the same as the parts of the machine illustrated in FIG. 1 have been designated by the same numbers. In this machine 300 the right end of the pusher bar 34 is connected directly to the chain 62 by an angle member 302 bolted to the chain by a bolt 304, and welded or otherwise secured to the end of the pusher rod. When the chain 62 is driven by the drive sprocket 46 the pusher rod 34 advances as previously described to advance the yoke 36 which pushes the roots of the tree through the trough 24 and mandrel 26.

When the pusher rod 34 is completely advanced a depending finger 310 pivotally mounted on the angle member 302 trips a camming member 312 to disengage a clutch 314 which is similar to the clutch 60. Upon the disengagement of the clutch 314, a suitable spring 316 most clearly illustrated in FIG. 12 drives the chain 62 in the reverse direction to retract the pusher bar 34. The right end of the spring 316 is connected to the frame 12 and the left end thereof is connected to the lower portion of the chain 62 so as to be placed under tension by the clockwise movement of the chain 62 as viewed in FIG. 12 which advances the pusher rod 34. A suitable shock absorbing stop device 317 is provided to cushion the impact of the pusher rod 34 which is rapidly retracted by the spring 316 when the clutch 314 is disengaged.

As the pusher bar 34 retracts, the finger 310, which is free to pivot in a clockwise direction until it strikes a pin 318, ratchets past camming members 320 and 322 which are similar to the camming members 196 and 162 previously described with the exception that the upper ends thereof are twisted through 90° to adapt them for actuation by the finger 310 when the pusher rod 34 is advanced by the chain 62.

Referring particularly to FIGS. 12, 13, 16 and 17 the clutch 314 has the lug 210 and roller 212 thereon which are driven by the output shaft 56 of the speed reducer 52 as did the clutch 60 previously described. The roller 212 engages the curved end portion 216 which in the clutch 314 being described is connected directly to a tubular member 324. As most clearly illustrated in FIG. 17 the right end of the tubular member 324 is telescopically disposed over the left end of the output shaft 56 of the speed reducer and the left end of the tubular member is fixed on a stud 326 by a pin 327. The stud 326 threadably engages the drive sprocket 46, and a ball bearing 328 is disposed between the tubular member 324 and the drive sprocket 46.

Figure 16:
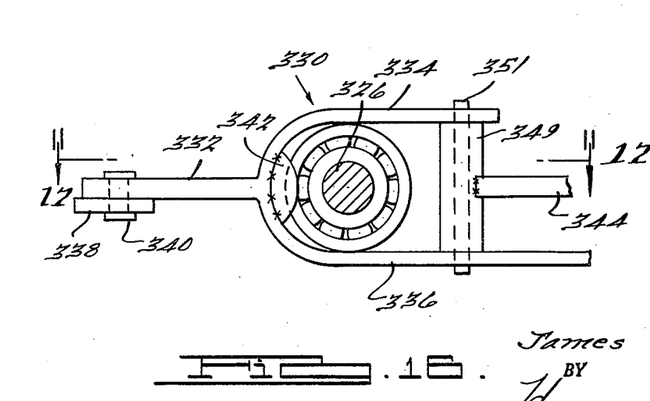
FIG. 16 is an enlarged sectional view of the structure illustrated in FIG. 13 taken along the line 16—16 thereof.
Figure 17:
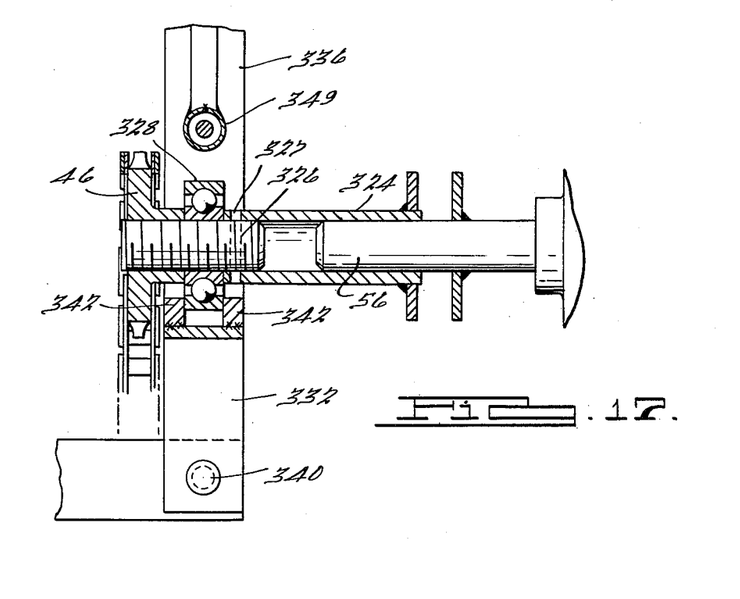
FIG. 17 is a sectional view of the structure illustrated in FIG. 16 taken along the line 17—17 thereof.

A yoke 330 having a central leg 332 and two parallel arms 334 and 336, as most clearly illustrated in FIG. 16, has the leg 332 thereof pivotally supported by a pin 340 on a plate 338 secured to the longitudinal bar 14 of the tripod frame with the legs 334 and 336 extending over the outer race of the ball bearing 328. Suitable projections 342 are secured to the yoke between the legs 334 and 336 in position to engage either side of the outer race of the ball bearing to shift the tubular member 324 to engage and disengage the curved end portion 216 with the roller 212 to engage and disengage the clutch 214. Of course, since the drive sprocket 46 is supported on the stud 326 it is also moved by the yoke 330. The yoke is shifted by a curved rod 344 which is pivotally mounted intermediate its ends on a bracket 346 by a pin 348 or the like, the bracket 346 being suitably secured to the longitudinal bar 14. The left end of the curved rod 344 carries a bushing 349 which is journaled on a pin 351 connected between the legs 334 and 336 of the yoke. The other end of the curved rod 344 is pivotally connected to one end of a rod 350 and the other end of the rod 350 is pivotally connected to one leg of a bellcrank 352 with the other leg of the bellcrank being pivotally connected to a rod 354 having an enlarged head 356 on the upper end thereof.

The end of the curved rod 344 which is pivotally connected to the rod 350 is also pivotally connected to one end of a rod 358 having the other end thereof pivotally connected to the camming member 312 which is supported on a vertical portion 362 of a member 364 pivotally connected to the longitudinal bar 14 of the frame. A suitable spring 366 is also connected between the camming member 312 and a bracket 382 welded to a bracket 368 which in turn is fixed to the longitudinal bar 14, the spring exerting a tension force that normally pulls the camming member 312 toward the bracket 382.

With this construction the enlarged head 356 on the end of the rod 354 which is slidably carried by a bracket 370 supported on a bar 371 welded to the frame 12 can be pressed downwardly to pivot the curved rod 344 in a direction to engage the clutch 314 to drive the sprocket 46. This immediately advances the pusher bar 34 as previously described until the finger 310 on the end thereof trips the camming member 312 which pivots the curved rod 344 in the opposite direction, because of its connection thereto by the rod 358, to disengage the clutch 314 by shifting the yoke 330 in the opposite direction. As soon as the clutch is disengaged the spring 316 immediately drives the chain in the reverse direction to retract the pusher bar as previously described.

The overall operation of the machine 300 will now be described in order to place the operation of the clutch 314 and its control of the movement of the pusher bar 34 in context. Assuming that the machine is in the position illustrated in FIG. 11, and that the semicylindrical plate 28 is retracted as illustrated in FIG. 4, a tree is placed in the trough 24 as previously described and the operator grasps a handle 137 to swing the semicylindrical plate forwardly and places his foot on the foot rest 128 to force the semicylindrical plate 28 downwardly over the tree roots until the latch mechanism 146 is actuated to lock the semicylindrical plate 28 in the position illustrated in FIG. 11. The operator then depresses the enlarged head 356 to engage the clutch 314 which drives the sprocket 46 and chain 62 to advance the pusher bar 34 and yoke 36 in the forward end thereof. This, of course, pushes the tree roots through the mandrel 26 and into a bag as previously described.

When the finger 310 on the end of the pusher bar 34 trips the camming member 322, the latch mechanism 146 is released in the same manner as it was released by the latch member 162 of the machine illustrated in FIG. 1 to enable the spring 130 to swing the semicylindrical plate 28 up out of the way. The pusher bar 34 continues to advance until the finger 310 trips the camming member 320 which pulls on the rod 192 to release latching mechanism 374 which is similar to the latching mechanism 170 of the machine of FIG. 1. When the latch mechanism 374 is released the upper portion 172 of the mandrel 26 swings open to enable the tree or plant to be lifted from the machine as before.

The pusher bar 34 will, of course, continue to be advanced by the chain 62 until the finger 310 on the end thereof trips the camming member 312 to disengage the clutch 314 and enable the spring 316 illustrated in FIG. 12 to quickly retract the pusher bar 34 until the end thereof strikes the shock absorber 317. The machine is then ready for the operator to place a new tree or plant in the trough 24, swing the upper semicylindrical plate 28 downwardly into its closed position and to depress the enlarged head 356 to again engage the clutch 314 to advance the pusher bar 34.

Figure 13:
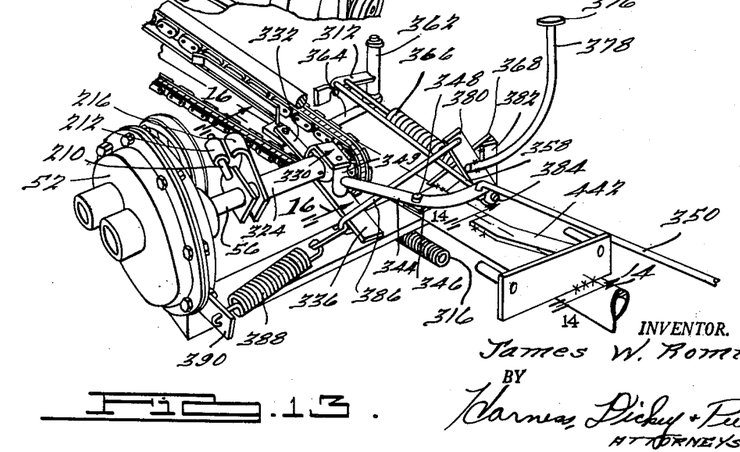
FIG. 13 is an enlarged broken perspective view of the central portion of the machine illustrated in FIG. 11.

In case the machine should jam at any time the operator can quickly disengage the clutch 314 to immediately stop the advancement of the pusher bar 34 by pressing on the enlarged head 376 on the end of a curved rod 378 most clearly illustrated in FIGS. 11 and 13. The lower end of the rod 378 is welded to a bracket 380 which is pivotally connected to the bracket 382 by a pin 384, the bracket 382 being suitably affixed to the bracket 368 carried by the longitudinal bar 14 as previously described. A rod 386 has one end thereof pivotally connected to the upper end of the bracket 380 and the other end thereof hooked over the leg 336 of the yoke 330 which is of greater length than the leg 334 thereof. Thus, when the operator depresses the enlarged head 376, the bracket 380 is pivoted in a clockwise direction as viewed in FIG. 13, and the rod 386 pulls on the leg 336 of the yoke to disengage the clutch 314. A suitable spring 388 is connected between a bracket 390 secured to the frame and the end of the rod 386 to normally bias the enlarged head 376 to its uppermost position as illustrated. By connecting the spring 388 to the rod 386 in this manner rather than directly to the leg 336 of the yoke, the spring 366 connected to the camming member 312 can be relied on to normally bias the yoke 330 in a direction to maintain the clutch 314 in its disengaged position without interference from the spring 388. However, once the clutch is engaged, the hooked portion 216 will hook over the roller 212 to maintain the clutch engaged against the pull of the spring 366 until the hooked portion is positively disengaged by the actuation of either the camming member 312 or the curved rod 378.

Referring to FIGS. 11 and 19, a spacer 394 which is attached to a bushing 396 pivotally mounted on a pin 398 bolted to the longitudinal bar 14 by a pair of plates 400 and bolts 402 can be pivoted from the position illustrated in FIG. 11 to the position illustrated in FIG. 19 to vary the distance the pusher bar 34 can be retracted. When the spacer 394 is in the position illustrated in FIG. 19 the right end of the angle member 302 strikes against the spacer which transmits the shock to the shock absorber 317, and when the spacer is swung out of the way to the position illustrated in FIG. 11 the angle member 302 can strike directly against the shock absorber which enables the pusher bar 34 to retract a greater distance.

Referring to FIGS. 11 and 20, the right end of the chain 62 extends over an idler sprocket 404 which is journaled on a bushing 406 carried by a stud 408 having head 410 thereof welded directly to the longitudinal bar 14 of the frame of the machine. Nut 409 and washer 411 fix the bushing on the stud 408. A suitable long narrow plate 412 is also supported beneath the chain 62 by brackets 414 to prevent the upper portion of the chain from sagging, and a suitable guide 416 (FIG. 12) may be disposed on the side of the chain to maintain it generally in alignment with the plate 412 when the drive sprocket 46 is shifted by the yoke 330 as described.

Figures 13, 14, 15:
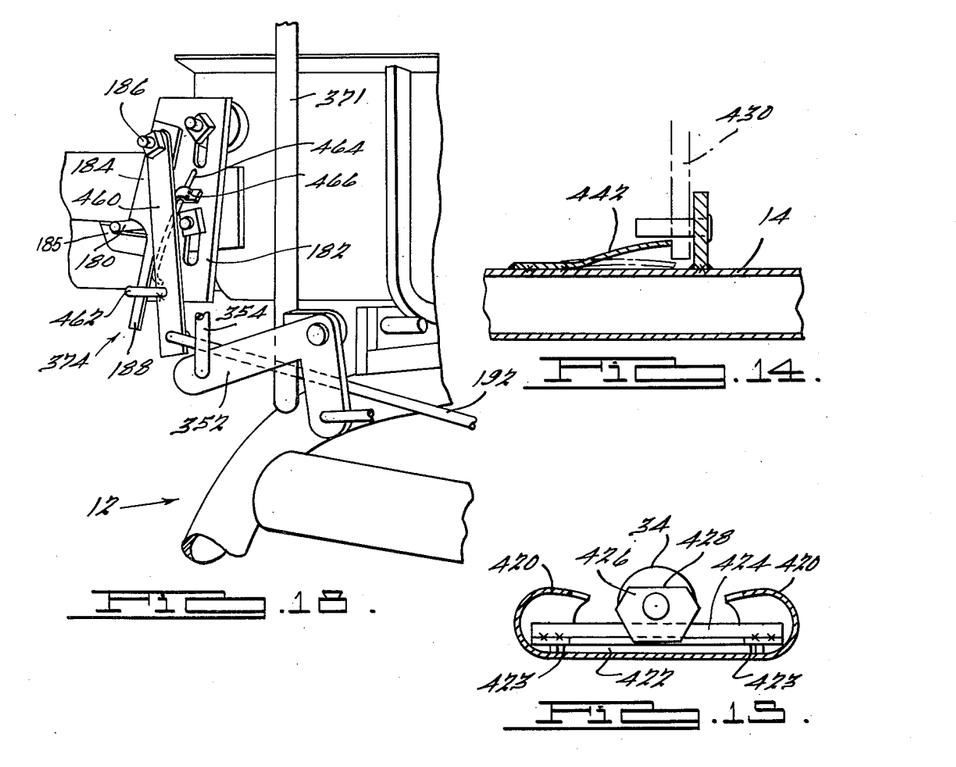
FIG. 14 is an enlarged sectional view of the structure illustrated in FIG. 13 taken along the line 14—14 thereof.
FIG. 15 is an enlarged sectional view of the structure illustrated in FIG. 12 taken along the line 15—15 thereof.

An important feature of the machine 300 is the construction that enables the trough 24 to be easily removed to enable troughs of different sizes to be used, the lower portion of the mandrel 26 being attached directly to the trough 24 so that it is removed and replaced along with the trough. To remove the trough 24 and mandrel 26, curved plate 418, which pivotally carries the yoke 36 in substantially the same manner that the curved plate 38 pivotally carries the yoke 36 as illustrated in FIG. 4, must be removed first. Referring to FIGS. 12 and 15 it will be observed that the curved plate 418 has rolled side edges 420 which taper inwardly and decrease in height at one end to slidably engage a plate 422 welded to the forward end of the pusher rod 34, the other end of the curved plate 418 being slidably supported on the trough 24 and fitting beneath pads 423 welded to the ends of a bar 424 which is fixed to the upper surface of the curved plate 418 by the pads 423 so as to extend transversely to the pusher bar 34. A bolt 426 having a head with an enlarged flat 428 on one side thereof is screwed into the forward end of the pusher rod 34 to draw the end of the pusher bar into abutting engagement with the transverse bar 424 with the head of the bolt 426 abuttingly engaging the other side of the transverse bar to prevent axial movement of the pusher bar 34 relative to the curved plate 418. With this construction, to remove the curved plate 418 to enable the trough 24 to be removed, the head of the bolt 426 is merely rotated through 180° from the position illustrated in FIG. 15 so that the enlarged flat 428 faces downwardly. This enables the pusher bar 34, plate 422 and bolt 426 to be slidably disengaged from the curved plate 418 since the head of the bolt will clear the bar 424. The curved plate may then be completely removed from the machine.

As most clearly illustrated in FIGS. 12–14, the trough 24 has transverse plates 430 and 432 secured to the under side thereof. The plates 430 and 432 have apertures in each end thereof which are slidably disposed over pins 436 projecting axially from the ends of plates 438 and 440 welded or otherwise supported directly on the frame 12 of the machine. With this construction, the trough 24 can be simply moved toward the rear of the machine until the plates 430 slip off the pins 436 to enable the trough and mandrel 26 to be removed. A suitable spring member 442 is secured to the longitudinal bar 14 behind the plate 430 with the end thereof engaging the plate 430 to lock the trough 24 in position. To enable the plates 430 and 432 to be disengaged from the pins 436 to remove the trough, the spring member 442 is simply depressed to the position illustrated in dotted and dashed lines in FIG. 14.

Of course, before the trough 24 can be removed the semicylindrical plate 28 must be removed. To enable the semicylindrical plate to be easily removed, it is slidably mounted on the upper end of the curved bar 136 by a pair of clamps 446 and 447 secured to a plate 448 extending upwardly within and welded to the yoke 132 which carries the semicylindrical plate 28. With this construction, the semicylindrical plate 28 can be quickly disengaged by simply sliding it off of the end of the curved bar 136. A suitable U-shaped bracket 450 is provided with a threaded stud 452 threaded through the yoke 132 and bracket 447 and bearing against the curved bar 136 to act as a set screw to releasably lock the yoke 132 to the curved bar 136, the U-shaped bracket 450 being similar to a wing nut to enable the stud 452 to be tightened and loosened without the assistance of a separate tool.

It will also be observed in FIG. 12 that a curved rod 454 projects from the mandrel 26. The curved rod 454 forms part of or is connected to the right end of a similar curved rod (not shown) which forms the left end of the upper portion 172 of the mandrel 26 and functions as a reinforcing flange. The curved rod 454 pivots with the upper portion 172 which is pivotally connected to the lower half of the mandrel 26 by a rod 455 secured to and projecting from the trough 24. The upper portion 172 is resiliently biased by the spring 176 as previously described so as to pivot open when the latch mechanism 374 releases the pin 180 as will be described, the curved rod 454 engaging the underside of the mandrel 26 to limit the pivotal movement of the upper portion 172 of the mandrel by the spring 176. A bar 458 is secured to the side of the trough 24 and extends outwardly therefrom. The end 459 of the bar 458 is bent at a right angle thereto in position to engage the curved bar 136 to limit the pivotal movement thereof.

Referring to FIG. 18 it will be observed that the latching mechanism 374 is very similar to the latching mechanism 170 previously described with the exception that an additional lever 460 is provided which is pivotally connected to the bolt 186 to which the locking member 184 is pivotally connected. The locking member 184 locks the pin 180 projecting from the upper portion 172 of the mandrel 26 as previously described, and the lower end of the lever 460 is pivotally connected to the rod 192. A hook 462 is welded to the lever 460 and engages the finger 188 extending downwardly from the locking member 184 so that when the rod 192 is actuated by the camming member 320 as previously described the locking member 184 will be disengaged from the pin 180 to enable the spring 176 to pivot the upper portion 172 of the mandrel open until the curved rod 454 abuts against the bottom of the mandrel 26 as already described. With this construction, the locking 184 can be resiliently biased in a clockwise direction by a suitable spring 464 having the upper end thereof fixed to the plate 182 by a clamp 466. The lower end of the spring bears against the locking member 184 so as to independently urge it into its locking position as illustrated in FIG. 18. Consequently, when the upper portion 172 of the mandrel is closed by the operator, which moves the pin 180 into the position illustrated, the locking member 184 can be easily moved out of the way by merely overcoming the resistance of the spring without shifting the rod 192.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A machine for packaging the roots of a plan comprising a supporting frame, an upwardly presenting trough mounted on said frame, means for compacting material about said roots in said trough, a split mandrel in extension of one end of said trough, a curved plate slidably supported on the other end of said trough, a pusher bar having one end fixed to said curved plate and the other end extending away from said trough and mandrel and slidably supported on said frame, a yoke pivotally mounted on said curved plate, spring means for biasing said yoke to a vertical position and enabling said yoke to pivot towards said mandrel against the action of the spring, and driving means connected to said pusher bar for advancing said curved plate and yoke forwardly through said trough and mandrel to a forward position wherein said yoke projects from said mandrel and a portion of said curved plate remains in the mandrel and thereafter retracting said yoke and curved plate to their starting position.

2. A machine for packaging the roots of a plant comprising a supporting frame, an upwardly presenting trough mounted on said frame, means for compacting material about said roots in said trough, a split mandrel mounted on said frame in extension of one end of said trough, a curved plate slidably supported on the other end of said trough, a pusher bar having one end fixed to said curved plate and the other end extending away from said trough and mandrel and slidably supported on said frame, a yoke pivotally mounted on the end of said curved plate, spring means for biasing said yoke to a vertical position and enabling said yoke to pivot towards said mandrel against the action of the spring, driving means connected to said pusher rod for advancing said curved plate and yoke forwardly through said trough and mandrel to a forward position wherein said yoke projects from said mandrel and a portion of said curved plate remains in the mandrel and thereafter re-tracting said yoke and curved plate to their starting position, said driving means comprising an endless chain and sprocket driving mechanism mounted on said frame with said chain traveling along a line substantially parallel to said pusher bar, means on said pusher bar for releasably engaging said chain to advance the pusher bar to said forward position, and spring means biasing said pusher bar to said starting position.

3. The subject matter as claimed in claim 1 wherein said driving means comprises a sprocket journaled on said frame, an endless chain having one end engaged over said sprocket and extending substantially parallel to said pusher bar, a rod having a curved end portion fixed to said frame for slidably supporting the other end of said endless chain, a hook member pivotally mounted on said pusher bar for releasably engaging said chain to drive said pusher bar forwardly toward said mandrel, means for camming the hook member out of engagement with said chain by said sprocket, spring means for biasing said pusher bar rearwardly toward said starting position, bumper means for cushioning the return of said pusher bar to said starting position by said spring means, and means for rotatably driving said sprocket.

4. A machine for packaging the roots of a plant comprising a supporting frame, an upwardly presenting trough mounted on said frame, a mandrel mounted on said frame in extension of said trough, means for compacting the roots of said plant and forming a tube with said trough, and pusher means for advancing said plant through said tube and mandrel, said compacting means comprising a semicylindrical plate, linkage means pivotally connected to said frame and supporting said plate for movement toward the trough to compact said roots therein and form a tube with said trough, said linkage means comprising a curved bar having one end pivotally mounted on said frame and a footrest portion formed on the other end thereof, a linkage assembly supporting said semicylindrical plate on said curved bar, and spring means for normally biasing said curved bar to a position wherein said semicylindrical plate is clear of said trough whereby said plate can be moved over said trough to compact said roots when a force is exerted on said footrest.

5. A machine for packaging the roots of a plant comprising a supporting frame, an upwardly presenting trough mounted on said frame, a mandrel mounted on said frame in extension of said trough, means for compacting the roots of said plant and forming a tube with said trough, a pusher bar, a yoke pivoted to said pusher bar for advancing said plant through said tube and mandrel when the bar is advanced, said compacting means comprising a semicylindrical plate, linkage means pivotally connected to said frame and supporting said plate for movement toward the trough to compact said roots therein and form a tube with said trough, said linkage means comprising a curved bar having one end pivotally mounted on said frame and a footrest portion formed on the other end thereof, a linkage assembly supporting said semicylindrical plate on said curved bar, spring means for normally biasing said curved bar to a position wherein said semicylindrical plate is clear of said trough whereby said plate can be moved over said trough to compact said roots when a force is exerted on said footrest, and latch means for releasably latching said curved bar when said plate is moved into compacting position over said trough.

6. The subject matter as claimed in claim 5 wherein said latching mechanism comprises a rod having one end pivotally mounted on said frame, a tubular member slidably disposed over said rod, an angle-shaped member having a horizontal portion and a vertical portion, said horizontal portion being fixed to the end of said tubular member and adapted to engage said linkage means when said semicylindrical plate is in compacting position to latch the linkage means in this position, and latching spring means connected to said tubular member to prevent it from sliding off said rod and to resiliently bias the latching mechanism against said linkage means.

7. The subject matter as claimed in claim 6 including a camming member pivotally mounted on said frame in a position to be actuated by said advancing pusher means when it reaches a predetermined position, an ear projecting from said tubular member, and a rod interconnecting said ear and camming member, said latching spring means biasing said ear in a predetermined direction to resiliently maintain said camming member in a position to be actuated by said pusher means.

8. A machine for packaging the roots of a plant comprising a supporting frame, an upwardly presenting trough mounted on said frame, a mandrel mounted on said frame in extension of said trough, means for compacting the roots of said plant and forming a tube with said trough, and pusher means for advancing said plant through said tube and mandrel, said pusher means comprising a pusher bar having a yoke and plate fixed on one end thereof and slidably supported in said trough, said pusher bar extending away from said mandrel and having the other end thereof slidably supported on said frame, a sprocket journaled on said frame, an endless chain having one end engaged over said sprocket and extending substantially parallel to said pusher bar, a rod having a curved end portion fixed to said frame for slidably supporting the other end of said endless chain, a hook member pivotally mounted on said pusher bar for releasably engaging said chain to drive said pusher bar forwardly toward said mandrel, means for camming the hook member out of engagement with said chain by said sprocket, spring means for biasing said pusher bar rearwardly toward said starting position, bumper means for cushioning the return of said pusher bar to said starting position by said spring means, and means for rotatably driving said sprocket.

9. A machine for packaging the roots of a plant comprising a supporting frame, an upwardly presenting trough mounted on said frame, a mandrel mounted on said frame in extension of said trough, means for compacting the roots of said plant and forming a tube with said trough, and pusher means for advancing said plant through said tube and mandrel, said mandrel comprising upper and lower semicylindrical plates pivotally connected together along one side thereof, spring means for normally biasing said upper plate to an open position, a pin projecting radially from the pivoting edge of said upper plate, latch means on said trough for releasably engaging said pin to latch said upper plate in its closed position, said latch means comprising a plate fixed to said trough and having a laterally extending finger adapted to underlie said pin when said upper plate is closed, a lever pivotally mounted on said plate and spring biased to a position wherein the lower edge thereof overlies said pin when the upper plate is closed, and camming means on said frame and connected to said lever operable by said pusher means to pivot said lever out of engagement with said pin whereby said upper plate automatically pivots to its open position when said camming means is operated by the pusher means.

10. A machine for packaging the roots of a plant comprising a supporting frame, an upwardly presenting trough mounted on said frame, means for compacting material about said roots in said trough, a pusher bar having one end disposed adjacent to the end of the trough and the other end thereof extending a substantial distance from said trough, a yoke pivotally mounted on the end of said pusher bar which is adjacent to said trough, spring means retaining said yoke substantially normal to said pusher bar, and driving means connected to said pusher bar for advancing said yoke forwardly through said trough and mandrel.

11. The invention as defined in claim 10 wherein said yoke has a socket, means on said pusher bar matable with said socket, and means releasably locking said pusher bar means in said socket.

12. A machine for packaging the roots of a plant comprising a supporting frame, an upwardly presenting trough, releasable means for releasably mounting said trough on said frame, means for compacting material about said roots in said trough, a mandrel mounted on one end of said trough in extension thereof, a curved plate slidably supported on the other end of said trough, a pusher bar having one end slidably engaging said curved plate and the other end thereof extending away from said trough and mandrel, means for restricting said one end of the pusher bar against sliding movement relative to said curved plate, a yoke mounted on said curved plate near the end thereof adjacent to said mandrel, and driving means connected to said pusher bar for advancing said curved plate and yoke forwardly through said trough, said releasable means comprising a first pair of transverse plates secured to the underside of said trough substantially perpendicular to the longitudinal axis thereof, a second pair of transverse plates secured to said frame, pin means on said second pair of transverse plates projecting longitudinally therefrom, said first pair of transverse plates being slidably disposed on said pin means and abuttingly engaging said second pair of transverse plates, and means for releasably retaining said first and second pairs of transverse plates in abutting engagement.

13. The invention as defined in claim 12 wherein said last mentioned means comprises a spring member having one end thereof secured to said frame and the other end thereof extending toward and being disposed adjacent to one of said second pair of transverse plates, said spring member being deflected downwardly by one of the first pair of transverse plates as it is slidably disposed over said pin means into abutting engagement with said one of the second pair of transverse plates, said spring member flexing upwardly after said one plate of the second pair of transverse plates has passed thereover to move the other end thereof into interfering relationship with said one plate of the first pair of transverse plates to lock transverse plates together.

14. A machine for packaging the roots of a plant comprising a supporting frame, an upwardly presenting trough, releasable means for releasably mounting said trough on said frame, a mandrel mounted on one end of said trough in extension thereof, a curved plate slidably supported on the other end of said trough, a pusher bar having one end slidably supported on said curved plate and the other end thereof extending away from said trough and mandrel, means for releasably locking said one end of the pusher bar to said curved plate, a yoke mounted on said curved plate near the end thereof adjacent to said mandrel, driving means connected to said pusher bar for advancing said curved plate and yoke forwardly through said trough and mandrel, a semicyclindrical plate, linkage means pivotally connected to said frame, and means for releasably supporting said semicylindrical plate on said linkage means for movement toward the trough to compact said roots therein and form a tube with said trough.

15. The invention as defined in claim 14 wherein said linkage means includes a pivoting bar having the upper end thereof extending upwardly past one side of said trough, and wherein said means for releasably supporting said semicyclindrical plate comprises a yoke frame construction fixed to said semicylindrical plate and slidably disposed over the end of said pivoting bar and releasably clamped thereto.

16. A machine for packaging the roots of a plant comprising a supporting frame, an upwardly presenting trough mounted on said frame, a split mandrel in extension of said trough, means for compacting the roots of said plant and forming a tube with said trough and pusher means for advancing said plant through said tube and mandrel, said mandrel comprising upper and lower semicylindrical plates pivotally connected together along one side thereof, spring means for normally biasing said upper plate to an open position, a pin projecting radially from the pivoting edge of said upper plate, latch means on said trough for releasably engaging said pin to latch said upper plate in a closed position, said latch means comprising a plate fixed to said trough and having a laterally extending finger adapted to underlie said pin when said upper semicylindrical plate is closed, a first lever pivotally mounted on said plate and spring biased in one direction to a position wherein the lower edge thereof overlies said pin when the upper semicylindrical plate is closed, a second lever pivotally connected to said first lever and having a hook projecting laterally therefrom and engaging said first lever in position to pivot said first lever in the other direction against said spring bias, and camming means on said frame connected to said second lever and operable by said pusher means to pivot said first lever out of engagement with said pin whereby said upper semicylindrical plate automatically pivots to an open position when said camming means is operated by the pusher means.

17. A machine for packaging the roots of a plant comprising a supporting frame, an upwardly presenting trough mounted on said frame, a mandrel in extension of one end of said trough, means for compacting the roots of said plant and forming a tube with said trough, a pusher bar having means on one end thereof for advancing said plant through said tube and mandrel, and drive means for advancing and retracting said pusher bar, said drive means comprising an endless chain mounted on said frame, means for moving said endless chain in one direction, clutch means for engaging and disengaging said moving means with said endless chain, the other end of said pusher bar being connected directly to said chain, means for disengaging said clutch means when said endless chain has completely advanced said pusher bar, and means for driving said endless chain in reverse when said clutch means is disengaged to retract said pusher bar.

18. The invention as defined in claim 17 including a shock absorber mounted on said frame in alignment with said pusher bar and in position to engage the other end of the pusher bar when it is completely retracted by said reverse driving means to limit the return stroke of the pusher bar, and a spacer bar movably mounted on said frame and movable from a first position wherein it is not in alignment with said pusher bar to a second position wherein one end thereof engages said shock absorber and the other end thereof is in position to be engaged by the other end of the pusher bar when it is retracted to decrease the distance which the pusher bar can be retracted.

19. A machine for packaging the roots of a plant comprising a supporting frame, an upwardly presenting trough mounted on said frame, a mandrel in extension of one end of said trough, means for compacting the roots of said plant and forming a tube with said trough, a pusher bar having means on one end thereof for advancing said plant through said tube and mandrel, and drive means for advancing and retracting said pusher bar, said drive means comprising a drive sprocket and an idler sprocket mounted on said frame in spaced apart relation, an endless chain engaging said sprockets and traveling along a line substantially parallel to said pusher bar, means for connecting the other end of said pusher bar to the endless chain, a motor and speed reducer unit for driving said drive sprocket to move said endless chain in one direction to advance said pusher bar, clutch means for engaging and disengaging said motor and speed reducer unit from said drive sprocket, a spring having one end connected to said frame and the other end connected to said endless chain in position to be extended by the movement of said endless chain in said one direction, means for engaging said clutch to drive the endless chain in said one direction to advance said pusher bar, camming means for disengaging said clutch means when said pusher bar has been completely advanced to enable said spring to rapidly drive the endless chain in the other direction to retract said pusher bar, and stop means on said frame to limit the retracting movement of the pusher bar.

20. The invention as defined in claim 19 wherein said idler sprocket is journaled on a bushing and the bushing is in turn journaled on a stud having a head on one end thereof welded to said frame and a nut on the other end thereof the axial movement of said bushing being limited by said head and nut.

21. A machine for packaging the roots of a plant comprising a supporting frame, an upwardly presenting trough mounted on said frame, a mandrel in extension of one end of said trough, means for compacting the roots of said plant and forming a tube with said trough, a pusher bar having means on one end thereof for advancing said plant through said tube and mandrel, and drive means for advancing and retracting said pusher bar, said drive means comprising a drive sprocket, an endless chain engaging said drive sprocket and traveling along a line substantially parallel to said pusher bar, means for connecting the other end of said pusher bar to the endless chain, a motor and speed reducer unit having a shaft for driving said drive sprocket to move said endless chain in one direction to advance said pusher bar, and clutch means embodying a tubular member on said sprocket and a lug on said speed reducer shaft for engaging and disengaging said motor and speed reducer unit from said drive sprocket, a first linkage means on said frame for engaging said clutch means by connecting said tubular member to said lug, and camming means on said frame for disengaging said clutch means by disconnecting said lug from said tubular member when said pusher bar has been completely advanced by the endless chain.

22. A machine for packaging the roots of a plant comprising a supporting frame, an upwardly presenting trough mounted on said frame, a mandrel in extension of one end of said trough, means for compacting the roots of said plant and forming a tube with said trough, a pusher bar having means on one end thereof for advancing said plant through said tube and mandrel, and drive means for advancing and retracting said pusher bar, said drive means comprising a drive sprocket, an endless chain engaging said drive sprocket and traveling along a line substantially parallel to said pusher bar, means for connecting the other end of said pusher bar to the endless chain, a motor and speed reducer unit for driving said drive sprocket to move said endless chain in one direction to advance said pusher bar, clutch means for engaging and disengaging said motor and speed reducer unit from said drive sprocket, said clutch means comprising a shaft rotatably driven by said motor and speed reducer unit, a lug projecting radially from the end of said shaft furthest removed from the motor and speed reducer unit, a tubular member substantially coaxially aligned with said shaft and having one end thereof secured to said drive sprocket, means for telescopically supporting the other end of said tubular member on said end of said shaft, a latch member projecting radially from said other end of the tubular member and adapted to hook said lug to drivingly connect said shaft and tubular member, yoke means pivotally mounted on said frame for pivoting said tubular member and drive sprocket from a first position wherein said latch member engages said lug to a second position wherein said latch member does not engage said lug, a first linkage means on said frame for pivoting said yoke means to move said tubular member to said first position wherein said latch member and lug are engaged, and camming means on said frame for pivoting said yoke means to move said tubular member to said second position when said pusher bar has been completely advanced by the endless chain.

23. The invention as defined in claim 22 including a second linkage means mounted on said frame and connected to said yoke means for moving said tubular member to said second position to disengage said elements.

References Cited in the file of this patent

UNITED STATES PATENTS

| | | |
|---|---|---|
| 2,229,862 | Menges | Jan. 28, 1941 |
| 2,244,078 | Perlberg | June 3, 1941 |
| 2,565,245 | Lebouitz | Aug. 21, 1951 |
| 2,733,795 | Christie | Feb. 7, 1956 |
| 2,847,808 | Romine | Aug. 19, 1958 |
| 2,907,157 | Romine | Oct. 6, 1959 |
| 2,908,367 | Sinclair | Oct. 13, 1959 |
| 2,955,396 | Preis | Oct. 11, 1960 |